US007173778B2

(12) United States Patent
Jing et al.

(10) Patent No.: US 7,173,778 B2
(45) Date of Patent: Feb. 6, 2007

(54) STAIN REPELLENT OPTICAL HARD COATING

(75) Inventors: Naiyong Jing, Woodbury, MN (US); Zai-Ming Qiu, Woodbury, MN (US); Thomas P. Klun, Lakeland, MN (US); Richard J. Pokorny, Maplewood, MN (US); George G. I. Moore, Afton, MN (US); Mark J. Pellerite, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 94 days.

(21) Appl. No.: 11/121,456

(22) Filed: May 4, 2005

(65) Prior Publication Data

US 2005/0249957 A1    Nov. 10, 2005

Related U.S. Application Data

(63) Continuation-in-part of application No. 11/026,700, filed on Dec. 30, 2004, and a continuation-in-part of application No. 10/841,159, filed on May 7, 2004, now Pat. No. 7,101,618.

(60) Provisional application No. 60/569,351, filed on May 7, 2004.

(51) Int. Cl.
*G02B 27/00* (2006.01)
*G02B 1/10* (2006.01)
*B32B 27/28* (2006.01)
*B32B 33/00* (2006.01)

(52) U.S. Cl. ............... 359/810; 428/336; 428/421; 428/522; 359/582

(58) Field of Classification Search ............... 359/582, 359/810; 428/336, 421, 522
See application file for complete search history.

(56) References Cited

U.S. PATENT DOCUMENTS

| 3,250,808 A | 5/1966 | Moore, Jr. et al. |
| 3,472,894 A | 10/1969 | Bartlett |
| 3,734,962 A | 5/1973 | Niederprüm et al. |

(Continued)

FOREIGN PATENT DOCUMENTS

EP    0433070 A2    6/1991

(Continued)

OTHER PUBLICATIONS

Bongiovanni et al., Macromol. Chem. Phys. 199, (1998) Perfluoropolyether Structures as Surface Modifying Agents of UV-Curable Systems, pp. 1099-1105.

(Continued)

*Primary Examiner*—David N. Spector
(74) *Attorney, Agent, or Firm*—Carolyn A. Fischer

(57) ABSTRACT

A hard coating composition for use as a stain repellent single layer on an optical display. The coating composition adds a monomer of a mono or multi(methyl)acrylate bearing at least one monovalent hexafluoropolypropylene oxide derivative and a free radically reactive compatibilizer consisting of either a fluoroalkyl-group containing acrylate compatibilizer or a fluoroalkylene-group containing acrylate compatibilizer to a conventional hydrocarbon-based hard coat formulation. The resultant coating is substantially smooth and forms a durable surface layer that has low surface energy that is stain and ink repellent.

27 Claims, 1 Drawing Sheet

U.S. PATENT DOCUMENTS

| | | |
|---|---|---|
| 4,262,072 A | 4/1981 | Wendling et al. |
| 4,321,404 A | 3/1982 | Williams et al. |
| 4,472,480 A | 9/1984 | Olson |
| 4,567,073 A | 1/1986 | Larson et al. |
| 4,614,667 A | 9/1986 | Larson et al. |
| 4,654,233 A | 3/1987 | Grant et al. |
| 4,665,144 A | 5/1987 | Ohmori et al. |
| 4,681,925 A | 7/1987 | Strepparola et al. |
| 4,855,184 A | 8/1989 | Klun et al. |
| 4,873,140 A | 10/1989 | McIntyre |
| 4,968,116 A | 11/1990 | Hulme-Lowe et al. |
| 4,985,473 A | 1/1991 | Williams et al. |
| 5,002,978 A | 3/1991 | Goldenberg |
| 5,008,534 A | 4/1991 | Yonezawa et al. |
| 5,021,501 A | 6/1991 | Ohmori et al. |
| 5,057,585 A | 10/1991 | Agou et al. |
| 5,148,511 A | 9/1992 | Savu et al. |
| 5,239,026 A | 8/1993 | Babirad et al. |
| 5,461,173 A | 10/1995 | Sato et al. |
| 5,609,990 A | 3/1997 | Ha et al. |
| 5,677,050 A | 10/1997 | Bilkadi et al. |
| 5,948,478 A | 9/1999 | Lenti et al. |
| 5,962,611 A | 10/1999 | Meijs et al. |
| 6,127,498 A | 10/2000 | Tonelli et al. |
| 6,150,024 A | 11/2000 | Dhoot et al. |
| 6,224,949 B1 | 5/2001 | Wright et al. |
| 6,238,798 B1 | 5/2001 | Kang et al. |
| 6,376,572 B1 | 4/2002 | Turri |
| 6,660,338 B1 | 12/2003 | Hargreaves |
| 6,660,389 B2 | 12/2003 | Liu et al. |
| 6,950,236 B2 | 9/2005 | Hokazono et al. |
| 7,101,618 B2 * | 9/2006 | Coggio et al. .............. 428/336 |
| 2001/0033934 A1 | 10/2001 | Port et al. |
| 2002/0001710 A1 | 1/2002 | Kang et al. |
| 2002/0085284 A1 | 7/2002 | Nakamura et al. |
| 2002/0111518 A1 | 8/2002 | Wang et al. |
| 2002/0115820 A1 | 8/2002 | Wang et al. |
| 2002/0122925 A1 | 9/2002 | Liu et al. |
| 2003/0012936 A1 | 1/2003 | Draheim et al. |
| 2003/0026997 A1 | 2/2003 | Qiu et al. |
| 2003/0226818 A1 | 12/2003 | Dunbar et al. |
| 2004/0077237 A1 | 4/2004 | Audenaert et al. |
| 2004/0077238 A1 | 4/2004 | Audenaert et al. |
| 2004/0077775 A1 | 4/2004 | Audenaert et al. |
| 2004/0081764 A1 | 4/2004 | Liu et al. |
| 2004/0124396 A1 | 7/2004 | Flynn et al. |
| 2005/0106404 A1 | 5/2005 | Hayashida et al. |
| 2005/0123741 A1 | 6/2005 | Hayashida et al. |
| 2005/0136252 A1 | 6/2005 | Chisholm et al. |
| 2005/0158504 A1 | 7/2005 | Itoh et al. |
| 2005/0158558 A1 | 7/2005 | Hayashida et al. |
| 2005/0249956 A1 * | 11/2005 | Jing et al. .................. 428/421 |

FOREIGN PATENT DOCUMENTS

| | | |
|---|---|---|
| EP | 0 479 029 B1 | 4/1992 |
| EP | 0339880 | 12/1993 |
| EP | 1057849 B1 | 12/2000 |
| JP | 61-111308 | 5/1986 |
| JP | 5209030 | 8/1993 |
| JP | 6-211945 | 8/1994 |
| JP | 10-241581 | 9/1998 |
| JP | 11080312 A | 3/1999 |
| JP | 11-329236 | 11/1999 |
| JP | 2000-301053 | 10/2000 |
| JP | 2001-035363 | 2/2001 |
| JP | 2002-6102 | 1/2002 |
| JP | 2002 036457 A | 2/2002 |
| JP | 2002 332313 A | 11/2002 |
| JP | 2003-315503 | 11/2003 |
| JP | 2004 083877A TDK | 3/2004 |
| WO | WO 92/21492 | 12/1992 |
| WO | WO 01/30873 A | 5/2001 |
| WO | WO 02/066526 | 8/2002 |
| WO | WO 03/022906 | 3/2003 |
| WO | WO 03/099904 | 12/2003 |
| WO | WO 03/100157 | 12/2003 |
| WO | WO 03/100158 | 12/2003 |
| WO | WO 03/100159 | 12/2003 |
| WO | WO 04/002734 | 1/2004 |
| WO | WO 2004/060964 | 7/2004 |
| WO | WO 2005/049687 | 2/2005 |
| WO | WO 2005/061633 | 7/2005 |
| WO | WO 2005/111157 | 11/2005 |
| WO | WO 2005/113690 | 12/2005 |

OTHER PUBLICATIONS

Shacklette et al., Fluoropolymer 2002, Ultra-Low-Loss Polymers for Planar Photonic Applications Derived from Fluorinated Acrylate Monomers, 2 pgs.

Bongiovanni et al., American Chemical Society (2003), UV-Curing of Fluorinated Systems: Synthesis and Properties, Chapter 41, pp. 499-511.

* cited by examiner

STAIN REPELLENT OPTICAL HARD COATING

CROSS REFERENCE TO RELATED APPLICATIONS

The present invention is a Continuation-In-Part application of U.S. application Ser. No. 10/841,159, filed May 7, 2004 now U.S. Pat. No. 7,101,618; and U.S. application Ser. No. 11/026,700 filed Dec. 30, 2004; and claims priority to U.S. Provisional Application No. 60/569,351, filed May 7, 2004.

TECHNICAL FIELD AND INDUSTRIAL APPLICABILITY OF THE INVENTION

The present invention relates to optical hard coatings and more specifically to stain repellent optical hard coatings.

BACKGROUND OF THE INVENTION

Optical hard coating polymer films are becoming increasingly important in the display industry. New applications are being developed for hard coating films applied to optical display devices in, for example, the computer, television, appliance, mobile phone, aerospace and automotive industries.

The hard coatings are applied to the optical display surfaces to protect them from scratching and marking. Desirable product features in optical hard coats are the combination of a low percentage of reflected light (e.g. 1.5% or lower), durability to scratches and abrasions, and resistance to inks and stains.

Materials that have been used to date for surface protection include fluorinated polymers, or fluoropolymers. Fluoropolymers provide advantages over conventional hydrocarbon based materials in terms of high chemical inertness (in terms of acid and base resistance), dirt and stain resistance (due to low surface energy), low moisture absorption, and resistance to weather and solar conditions.

Because of the low surface energy characteristic that prevents satisfactory adhesion, and inherent softness that prevents good mechanical durability, the use of fluoropolymer coatings alone is not preferred. Thus, fluoropolymers have been investigated that are crosslinked to a hydrocarbon-based hard coating formulation that improves hardness and interfacial adhesion to a substrate. For example, it is known that free-radically curable perfluoropolyethers provide good repellency to inks from pens and permanent markers when added to ceramer hard coat compositions, which comprise a plurality of colloidal inorganic oxide particles and a free-radically curable binder precursor, such as described in U.S. Pat. No. 6,238,798 to Kang. However, the perfluoropolyether derivatives are not sufficiently compatible with ceramer hardcoats and tend to cause the coatings to dewet and produce a rough surface.

Thus, it is desirable to form a fluoropolymer-based hard coating with satisfactory smoothness, durability, ink and stain repellency and which also has good optical qualities.

SUMMARY OF THE INVENTION

The present invention provides an easy to clean, stain and ink repellent optical hard coating applied in a single layer.

In one preferred embodiment of the present invention, a composition for use as a cured hard coat layer in optical displays is formed from a mixture of a free-radically reactive material comprising a hydrocarbon-based hard coat composition, a mono- or multi-(meth)acryl compound bearing at least one monovalent hexafluoropolypropylene oxide moiety, and a free radically reactive compatibilizer selected from the group consisting of a fluoroalkyl-group containing compatibilizer and a fluoroalkylene-group containing compatibilizer. The composition may optionally contain inorganic particles ("ceramer" hard coating). As used herein, the term "(meth)acryl" refers to functional groups including acrylates, methacrylates, acrylamides, methacrylamides, alpha-fluoroacrylates, thioacrylates and thio-methacrylates. Also, the term "acrylate" is meant to encompass all (meth)acryl functional groups.

Further, the term "ceramer" is a composition having inorganic oxide particles, e.g. silica, of submicron dimensions dispersed in a binder matrix. The phrase "ceramer composition" is meant to indicate a ceramer formulation in accordance with the present invention that has not been at least partially cured, and thus is a flowing, coatable liquid. The phrase "ceramer composite" or "coating layer" is meant to indicate a ceramer formulation in accordance with the present invention that has been at least partially cured, so that it is a substantially non-flowing solid. Additionally, the phrase "free-radically reactive" refers to the ability of monomers, oligomers, polymers or the like to participate in crosslinking reactions upon exposure to a suitable source of curing energy.

The resultant coating provides satisfactory smoothness, durability, ink and stain repellency and further has good optical qualities.

Other objects and advantages of the present invention will become apparent upon considering the following detailed description and appended claims, and upon reference to the accompanying drawings.

DETAILED DESCRIPTION AND PREFERRED EMBODIMENTS OF THE INVENTION

Figure 1:
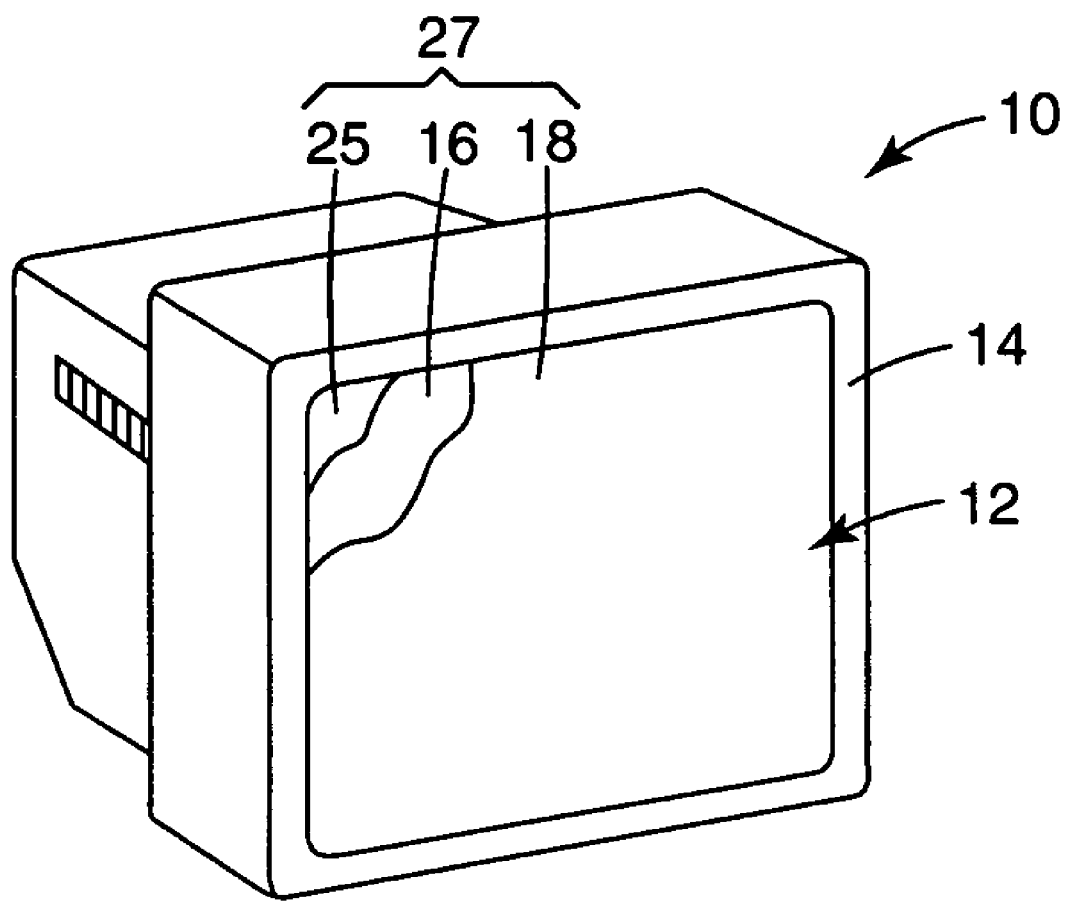
FIG. 1 illustrates an article having a hard coated optical display formed in accordance with a preferred embodiment of the present invention.

For the following defined terms, these definitions shall be applied, unless a different definition is given in the claims or elsewhere in the specification.

The term "polymer" will be understood to include polymers, copolymers (e.g. polymers using two or more different monomers), oligomers and combinations thereof, as well as polymers, oligomers, or copolymers that can be formed in a miscible blend.

The recitation of numerical ranges by endpoints includes all numbers subsumed within the range (e.g. the range 1 to 10 includes 1, 1.5, 3.33, and 10).

As used in this specification and the appended claims, the singular forms "a", "an", and "the" include plural referents unless the content clearly indicates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Unless otherwise indicated, all numbers expressing quantities of ingredients, measurements of properties such as contact angle, and so like as used in the specification and claims are to be understood to be modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should be at least be construed in light of the number of reported significant digits and by applying ordinary rounding techniques. Notwithstanding that the numerical ranges and parameters set forth in the broad scope of the invention are approximations, the numerical values set forth in the specific examples are reported as accurately as possible. Any numerical value, however, inherently contains certain errors necessarily resulting from the standard deviations found in their respective testing measurements.

The term "optical display", or "display panel", can refer to any conventional non-illuminated and in particular illuminated optical displays, including but not limited to multi-character multi-line displays such as liquid crystal displays ("LCDs"), plasma displays, front and rear projection displays, cathode ray tubes ("CRTs"), and signage, as well as single-character or binary displays such as light emitting diodes ("LEDs"), signal lamps and switches. The exposed surface of such display panels may be referred to as a "lens." The invention is particularly useful for displays having a viewing surface that is susceptible to being touched or contacted by ink pens, markers and other marking devices, wiping cloths, paper items and the like.

The protective coatings of the invention can be employed in a variety of portable and non-portable information display articles. These articles include PDAs, cell phones (including combination PDA/cell phones), LCD televisions (direct lit and edge lit), touch sensitive screens, wrist watches, car navigation systems, global positioning systems, depth finders, calculators, electronic books, CD and DVD players, projection televisions screens, computer monitors, notebook computer displays, instrument gauges, instrument panel covers, signage such as graphic displays and the like. The viewing surfaces can have any conventional size and shape and can be planar or non-planar, although flat panel displays are preferred.

The coating composition or coated film, can be employed on a variety of other articles as well such as for example camera lenses, eyeglass lenses, binocular lenses, mirrors, retroreflective sheeting, automobile windows, building windows, train windows, boat windows, aircraft windows, vehicle headlamps and taillights, display cases, eyeglasses, road pavement markers (e.g. raised) and pavement marking tapes, overhead projectors, stereo cabinet doors, stereo covers, watch covers, as well as optical and magneto-optical recording disks, and the like.

A combination of low surface energy (e.g. anti-soiling, stain resistant, oil and/or water repellent) and durability (e.g. abrasion resistance) is desired for the coating layer for these displays while maintaining optical clarity. The hard coating layer functions to decrease glare loss while improving durability and optical clarity.

The surface energy can be characterized by various methods such as contact angle and ink repellency, as determined by the test methods described in the Examples. The surface layer and articles described preferably exhibit a static contact angle with water of at least 70 degrees. More preferably, the contact angle is at least 80 degrees and more preferably at least 90 degrees. Alternatively, or in addition thereto, the advancing contact angle with hexadecane is at least 50 degrees and more preferably at least 60 degrees. Low surface energy results in anti-soiling properties as well as rendering the exposed surface easy to clean.

Another indicator of low surface energy relates to the extent to which ink from a pen or marker beads up when applied to the exposed surface. The surface layer and articles exhibit "ink repellency" when ink from pens and markers can be easily removed by wiping the exposed surface with tissues or paper towels, such as tissues available from the Kimberly Clark Corporation, Roswell, Ga. under the trade designation "SURPASS FACIAL TISSUE."

Referring now to FIG. 1, a perspective view of an article (here a computer monitor 10) is illustrated as having an optical display 12 coupled within a housing 14. The optical display 12 is a substantially transparent material having optically enhancing properties through which a user can view text, graphics or other displayed information. The optical display 12 includes hard coating layer 18 applied to an optical substrate 16.

Various permanent and removable grade adhesive compositions 25 may be coated on the opposite side of the substrate 16 (i.e. to that of the hardcoat 16) so the article can be easily mounted to a display surface. Typically, the adhesive 25, substrate 16, and hard coating layer 18 are prepackaged as a film 27 having a release layer (not shown) attached to the adhesive 25. The release layer is then removed and the adhesive layer coupled to the housing 14 or other area of the article 10 to form the optical display 12.

Suitable adhesive compositions 25 include (e.g. hydrogenated) block copolymers such as those commercially available from Kraton Polymers, Westhollow, Tex. under the trade designation "Kraton G-1657", as well as other (e.g. similar) thermoplastic rubbers. Other exemplary adhesives include acrylic-based, urethane-based, silicone-based and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesive are described in U.S. Patent Application Publication No. 2003/0012936. Several of such adhesives are commercially available from 3M Company, St. Paul, Minn. under the trade designations 8141, 8142, and 8161.

The substrate layer 16 may comprise or consist of any of a wide variety of non-polymeric materials, such as glass, or various thermoplastic and crosslinked polymeric materials, such as polyethylene terephthalate (PET), (e.g. bisphenol A) polycarbonate, cellulose acetate, poly(methyl methacrylate), polyolefins such as biaxially oriented polypropylene which are commonly used in various optical devices. The substrate may also comprises or consist of polyamides, polyimides, phenolic resins, polystyrene, styrene-acrylonitrile copolymers, epoxies, and the like. Typically the substrate will be chosen based in part on the desired optical and mechanical properties for the intended use. Such mechanical properties typically will include flexibility, dimensional stability and impact resistance. The substrate thickness typically also will depend on the intended use. For most applications, substrate thicknesses of less than about 0.5 mm are preferred, and more preferably about 0.02 to about 0.2 mm. Self-supporting polymeric films are preferred. The polymeric material can be formed into a film using conventional filmmaking techniques such as by extrusion and optional uniaxial or biaxial orientation of the extruded film. The substrate can be treated to improve adhesion between the substrate and the hardcoat layer, e.g., chemical treatment, corona treatment such as air or nitrogen corona, plasma, flame, or actinic radiation. If desired, an optional tie layer or primer can be applied to the substrate and/or hardcoat layer to increase the interlayer adhesion.

In the case of display panels, the substrate is light transmissive, meaning light can be transmitted through the substrate 16 such that the display can be viewed. Both transparent (e.g. gloss) and matte light transmissive substrates 16 are employed in display panels 10. Matte substrates 16 typically have lower transmission and higher haze values than typical gloss films. The matte films exhibit this property typically due to the presence of micron size dispersed inorganic fillers such as silica that diffuse light. Exemplary matte films are commercially available from U.S.A. Kimoto Tech, Cedartown, Ga. under the trade designation "N4D2A". In case of transparent substrates, hardcoat coated transparent substrates, as well as the display articles comprised of transparent substrates, the haze value is preferably less than 5%, more preferably less than 2% and even more preferably less than 1%. Alternatively or in addition thereto, the transmission is preferably greater than about 90%.

Various light transmissive optical film are known including but not limited to, multilayer optical films, microstructured films such as retroreflective sheeting and brightness enhancing films, (e.g. reflective or absorbing) polarizing films, diffusive films, as well as (e.g. biaxial) retarder films and compensator films such as described in U.S. Patent Application Publication No. 2004-0184150, filed Jan. 29, 2004, incorporated herein by reference.

As described is U.S. patent application Ser. No. 2003/0217806; incorporated herein by reference, multilayer optical films, i.e., films that provide desirable transmission and/or reflection properties at least partially by an arrangement of microlayers of differing refractive index. The microlayers have different refractive index characteristics so that some light is reflected at interfaces between adjacent microlayers. The microlayers are sufficiently thin so that light reflected at a plurality of the interfaces undergoes constructive or destructive interference in order to give the film body the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 μm. However, thicker layers can also be included, such as skin layers at the outer surfaces of the film, or protective boundary layers disposed within the film that separate packets of microlayers. Multilayer optical film bodies can also comprise one or more thick adhesive layers to bond two or more sheets of multilayer optical film in a laminate.

The reflective and transmissive properties of multilayer optical film body are a function of the refractive indices of the respective microlayers. Each microlayer can be characterized at least at localized positions in the film by in-plane refractive indices $n_x$, $n_y$, and a refractive index $n_z$ associated with a thickness axis of the film. These indices represent the refractive index of the subject material for light polarized along mutually orthogonal x-, y- and z-axes. In practice, the refractive indices are controlled by judicious materials selection and processing conditions. Films can be made by co-extrusion of typically tens or hundreds of layers of two alternating polymers A, B, followed by optionally passing the multilayer extrudate through one or more multiplication die, and then stretching or otherwise orienting the extrudate to form a final film. The resulting film is composed of typically tens or hundreds of individual microlayers whose thicknesses and refractive indices are tailored to provide one or more reflection bands in desired region(s) of the spectrum, such as in the visible or near infrared. In order to achieve high reflectivities with a reasonable number of layers, adjacent microlayers preferably exhibit a difference in refractive index ($\delta n_x$) for light polarized along the x-axis of at least 0.05. If the high reflectivity is desired for two orthogonal polarizations, then the adjacent microlayers also preferably exhibit a difference in refractive index ($\delta n_y$) for light polarized along the y-axis of at least 0.05. Otherwise, the refractive index difference can be less than 0.05 and preferably about 0 to produce a multilayer stack that reflects normally incident light of one polarization state and transmits normally incident light of an orthogonal polarization state. If desired, the refractive index difference ($\delta n_z$) between adjacent microlayers for light polarized along the z-axis can also be tailored to achieve desirable reflectivity properties for the p-polarization component of obliquely incident light.

Exemplary materials that can be used in the fabrication of polymeric multilayer optical film can be found in PCT Publication WO 99/36248 (Neavin et al.), incorporated herein by reference. Desirably, at least one of the materials is a polymer with a stress optical coefficient having a large absolute value. In other words, the polymer preferably develops a large birefringence (at least about 0.05, more preferably at least about 0.1 or even 0.2) when stretched. Depending on the application of the multilayer film, the birefringence can be developed between two orthogonal directions in the plane of the film, between one or more in-plane directions and the direction perpendicular to the film plane, or a combination of these. In special cases where isotropic refractive indices between unstretched polymer layers are widely separated, the preference for large birefringence in at least one of the polymers can be relaxed, although birefringence is still often desirable. Such special cases may arise in the selection of polymers for mirror films and for polarizer films formed using a biaxial process, which draws the film in two orthogonal in-plane directions. Further, the polymer desirably is capable of maintaining birefringence after stretching, so that the desired optical properties are imparted to the finished film. A second polymer can be chosen for other layers of the multilayer film so that in the finished film the refractive index of the second polymer, in at least one direction, differs significantly from the index of refraction of the first polymer in the same direction. For convenience, the films can be fabricated using only two distinct polymer materials, and interleaving those materials during the extrusion process to produce alternating layers A, B, A, B, etc. Interleaving only two distinct polymer materials is not required, however. Instead, each layer of a multilayer optical film can be composed of a unique material or blend not found elsewhere in the film. Preferably, polymers being coextruded have the same or similar melt temperatures.

Exemplary two-polymer combinations that provide both adequate refractive index differences and adequate interlayer adhesion include: (1) for polarizing multilayer optical film made using a process with predominantly uniaxial stretching, PEN/coPEN, PET/coPET, PEN/sPS, PET/sPS, PEN/Eastar,.TM. and PET/Eastar,.TM. where "PEN" refers to polyethylene naphthalate, "coPEN" refers to a copolymer or blend based upon naphthalene dicarboxylic acid, "PET" refers to polyethylene terephthalate, "coPET" refers to a copolymer or blend based upon terephthalic acid, "sPS" refers to syndiotactic polystyrene and its derivatives, and Eastar™ is a polyester or copolyester (believed to comprise cyclohexanedimethylene diol units and terephthalate units) commercially available from Eastman Chemical Co.; (2) for polarizing multilayer optical film made by manipulating the process conditions of a biaxial stretching process, PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol; (3) for mirror films (including colored mirror films), PEN/PMMA, coPEN/PMMA, PET/PMMA, PEN/Ecdel™, PET/Ecdel™, PEN/sPS, PET/sPS, PEN/coPET, PEN/PETG, and PEN/THV™, where "PMMA" refers to polymethyl methacrylate, Ecdel™ is a thermoplastic polyester or copolyester (believed to comprise cyclohexanedicarboxylate units, polytetramethylene ether glycol units, and cyclohexanedimethanol units) commercially available from Eastman Chemical Co., and THV™ is a fluoropolymer commercially available from 3M Company.

Further details of suitable multilayer optical films and related constructions can be found in U.S. Pat. No. 5,882,774 (Jonza et al.), and PCT Publications WO 95/17303 (Ouderkirk et al.) and WO 99/39224 (Ouderkirk et al.), all of which are incorporated herein by reference. Polymeric multilayer optical films and film bodies can comprise additional layers and coatings selected for their optical, mechanical, and/or chemical properties. See U.S. Pat. No. 6,368,699 (Gilbert et al.). The polymeric films and film bodies can also comprise inorganic layers, such as metal or metal oxide coatings or layers.

In one preferred embodiment, the hard coat layer 18 is formed from a cured coating composition in which a small amount of a mono or multi-(meth)acryl compound bearing at least one monovalent poly(hexafluoropropylene oxide) (HFPO) moiety and a compatibilizer such as a fluoroalkyl or fluoroalkylene substituted acrylate or multi-acrylate is added to a hydrocarbon-based hard coating composition optionally containing inorganic particles ("ceramer" hard coating).

The compatibilizer of the present invention minimizes incompatibility issues between the conventional hydrocarbon-based hard coat composition or ceramers and the HFPO derivative. The result is a generally smoother hard coat outer surface as seen by visual inspection. The compatibilizer is added at between about 2 and 15 weight percent and more preferably between about 2 to 10 weight percent, of the overall dry solids of composition of the layer 12. The compatibilizer must be present in an amount at least 3 and preferably at least 5 times the amount of the HFPO mono- or multi-(meth)acryl compound.

The free-radically reactive fluoroalkyl or fluoroalkylene group-containing compatibilizers are of the respective chemical formula: $R_fQ(X)_n$ and $(X)_nQR_{f2}Q(X)_n$, where $R_f$ is a fluoroalkyl, $R_{f2}$ is a fluoroalkylene, Q is a connecting group comprising an alkylene, arylene, arylene-alkylene, or alkylene-arylene group and may comprise a straight or branched chain connecting group which may contain heteroatoms such as O, N, and S, X is a free-radically reactive group selected from (meth)acryl, —SH, allyl, or vinyl groups and n is 1 to 3. Typical Q groups include: —$SO_2N$(R)$CH_2CH_2$—; —$SO_2N(CH_2CH_2)_2$—; —$(CH_2)_m$—; —$CH_2O(CH_2)_3$—; and —C(O)N(R)$CH_2CH_2$—, where R is H or lower alkyl of 1 to 4 carbon atoms and m is 1 to 6. Preferably the fluoroalkyl or fluoroalkylene group is a perfluoroalkyl or perfluoroalkylene group.

In one preferred embodiment, the compatibilizer is a perfluoroalkyl or perfluoroalkylene-substituted compatibilizer having a carbon chain of at least five carbon atoms attached to the acrylate portion and contains at least 30 weight percent of fluorine.

One preferred class of fluoroalkyl- or fluoroalkylene-substituted compatibilizers meeting these criteria for use in the composition of the hard coat layer 18 is the perfluorobutyl-substituted acrylate compatibilizers. Exemplary, non-limiting perfluorobutyl-substituted acrylate compatibilizers meeting these criteria and useful in the present invention include one or more of $C_4F_9SO_2N(CH_3)CH_2CH_2OC(O)CH=CH_2$, $C_4F_9SO_2N(CH_2CH_2OC(O)CH=CH_2)_2$, or $C_4F_9SO_2N(CH_3)CH_2CH_2OC(O)C(CH_3)=CH_2$.

Other non-limiting examples of preferred fluoroalkyl-substituted compatibilizer that may be utilized in the composition of the hard coat layer 18 include: 1H,1H,2H,2H-perfluorodecyl acrylate, available from Lancaster Synthesis of Windham, N.H. Numerous other (meth)acryl compounds with perfluoroalkyl moieties that may also be utilized in the composition of the hard coat layer 18 are mentioned in U.S. Pat. No. 4,968,116, to Hulme-Lowe et al., and in U.S. Pat. No. 5,239,026 (including perfluorocyclohexylmethyl methacrylate)), to Babirad et al., herein incorporated by reference. Other fluorochemical (meth)acrylates that meet these criteria and may be utilized include, for example, 2,2,3,3,4,4,5,5-octafluorohexanediol diacrylate- and ω-hydro 2,2,3,3,4,4,5,5-octafluoropentyl acrylate (H—$C_4F_8$—$CH_2O$—C(O)—CH=$CH_2$). Other fluorochemical (meth)acrylates that may be used alone, or as mixtures, are described in U.S. Pat. No. 6,238,798, to Kang et al., herein incorporated by reference.

In another preferred embodiment, the coating composition adds one or more mono or multi-(meth)acryl compounds bearing at least one monovalent poly(hexafluoropropylene oxide) (HFPO) moiety and a compatibilizer such as a fluoroalkyl- or fluoroalkylene-substituted thiol or polythiol to a ceramer hard coating composition. Non-limiting examples of this type of compatibilizer includes one or more of the following: $C_4F_9SO_2N(CH_3)CH_2CH_2OC(O)CH_2SH$, $C_4F_9SO_2N(CH_3)CH_2CH_2OC(O)CH_2CH_2SH$, $C_4F_9SO_2N(CH_3)CH_2CH_2SH$, and $C_4F_9SO_2N(CH_3)CH(OC(O)CH_2SH)CH_2OC(O)CH_2SH$.

As used in the examples, unless otherwise noted, "HFPO-" refers to the end group $F(CF(CF_3)CF_2O)_aCF(CF_3)$— of the methyl ester $F(CF(CF_3)CF_2O)_aCF(CF_3)C(O)OCH_3$, wherein "a" averages about 6.8, and the methyl ester has an average molecular weight of 1,211 g/mol, and which can be prepared according to the method reported in U.S. Pat. No. 3,250,808 (Moore et al.), the disclosure of which is incorporated herein by reference, with purification by fractional distillation.

The mono- or multi-(meth)acryl compound bearing at least one monovalent poly(hexafluoropropylene oxide) (HFPO) moiety preferably is in the form of a monoacrylate, and more preferably a multiacrylate. These materials are of the formula: $R_{fpe}Q(X)_n$ wherein Rfpe is the residue of a monovalent HFPO moiety, Q is a connecting group comprising an alkylene, arylene, arylene-alkylene, or alkylene-arylene group and may comprise a straight or branched chain connecting group which may contain heteroatoms such as O, N, and S, X is a free-radically reactive group selected from meth(acryl), —SH, allyl, or vinyl groups and n is 1 to 3. Typical Q groups when n=1 include: —$(CH_2)_m$—; —$CH_2O(CH_2)_3$—; and —C(O)NR$CH_2CH_2$—, where R is H or lower alkyl of 1 to 4 carbon atoms and m is 1 to 6.

One class of multi-(meth)acryl compound bearing at least one monovalent poly(hexafluoropropylene oxide) (HFPO)

moiety comprises compounds described in U.S. Provisional Application No. 60/569,351 entitled "Fluoropolyether Polyacryl Compounds", filed May 7, 2004, the disclosure of which is incorporated by reference.

Other mono- and multi-(meth)acryl compounds bearing at least one monovalent poly(hexafluoropropylene oxide) (HFPO) moiety comprise compounds which are Michael adducts of HFPO amine derivatives with multiacrylates described in U.S. application Ser. No. 10/841,792, entitled "Polymerizable Compositions, Methods Of Making The Same, And Composite Articles Therefrom," filed May 7, 2004, the disclosure of which is incorporated by reference.

The HFPO-multiacrylate can take on many different forms. Table I below includes three preferred HFPO-multiacrylates that may be used in the present invention. In another preferred embodiment, the HFPO derivative has the structure: 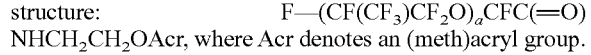
$NHCH_2CH_2OAcr$, where Acr denotes an (meth)acryl group.

The HFPO derivative is added at between about 0.01 and 1.0 weight percent of the overall dry solids composition of the layer 18. More preferably, the HFPO derivative is added at between about 0.06 to 0.75 weight percent of the overall dry solids composition of the layer 18 and most preferably 0.10 and 0.24 weight percent of the overall dry solids composition of the layer 18.

The hydrocarbon-based hard coat composition used in the composition of layer 18 in any of the preferred embodiments is a hydrocarbon-based material well known to those of ordinary skill in the optical arts. Most preferably, the hydrocarbon-based material is an acrylate-based hard coat material. One preferable hard coat material for use in the present invention is based on PETA (pentaerythritol tri/tetra acrylate).

Useful crosslinking agents for use in the hard coating composition may also include, for example, poly (meth) acryl monomers selected from the group consisting of (a) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate; (b) tri(meth)acryl containing compounds such as glycerol triacrylate, trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate, tris(2-hydroxyethyl)isocyanurate triacrylate; (c) higher functionality (meth)acryl containing compounds such as ditrimethylolpropane tetraacrylate, dipentaerythritol pentaacrylate, ethoxylated (4) pentaerythritol tetraacrylate, pentaerythritol tetraacrylate, caprolactone modified dipentaerythritol hexaacrylate; (d) oligomeric (meth)acryl compounds such as, for example, urethane acrylates, polyester acrylates, epoxy acrylates; polyacrylamide analogues of the foregoing; and combinations thereof. Such compounds are widely available from vendors such as, for example, Sartomer Company, Exton, Pa.; UCB Chemicals Corporation, Smyrna, Ga.; and Aldrich Chemical Company, Milwaukee, Wis. Additional useful (meth)acrylate materials include hydantoin moiety-containing poly(meth)acrylates, for example, as described in U.S. Pat. No. 4,262,072 (Wendling et al.).

In another embodiment, a particulate matting agent is incorporated into the composition of the layer 18 in order to impart anti-glare properties to the layer 18. The particulate matting agent also prevents the reflectance decrease and uneven coloration caused by interference with an associated hard coat layer. The particulate matting agent should preferably be transparent, exhibiting transmission values of greater than about 90%. Alternatively, or in addition thereto, the haze value is preferably less than about 5%, and more preferably less than about 2%, and most preferably less than about 1%.

Exemplary systems incorporating matting agents into a hard coating layer, but having a different hard coating composition, are described, for example, in U.S. Pat. No. 6,693,746, and herein incorporated by reference. Further, exemplary matte films are commercially available from U.S.A. Kimoto Tech of Cedartown, Ga., under the trade designation "N4D2A."

The amount of particulate matting agent added is between about 0.5 and 10% of the total solids of the composition, depending upon the thickness of the layer 18, with a preferred amount around 2%. The anti-glare layer 18 preferably has a thickness of 0.5 to 10 microns, more preferably 0.8 to 7 microns, which is generally in the same thickness range of gloss hard coatings.

The average particle diameter of the particulate matting agent has a predefined minimum and maximum that is partially dependent upon the thickness of the layer. However, generally speaking, average particle diameters below 1.0 microns do not provide the degree of anti-glare sufficient to warrant inclusion, while average particle diameters exceeding 10.0 microns deteriorate the sharpness of the transmission image. The average particle size is thus preferably between about 1.0 and 10.0 microns, and more preferably between 1.7 and 3.5 microns, in terms of the number-averaged value measured by the Coulter method.

As the particulate matting agent, inorganic particles or resin particles are used including, for example, amorphous silica particles, $TiO_2$ particles, $Al_2O_3$ particles, cross-linked acrylic polymer particles such as those made of cross-linked poly(methyl methacrylate), cross-linked polystyrene particles, melamine resin particles, benzoguanamine resin particles, and cross-linked polysiloxane particles. By taking into account the dispersion stability and sedimentation stability of the particles in the coating mixture for the anti-glare layer and/or the hard coat layer during the manufacturing process, resin particles are more preferred, and in particular cross-linked polystyrene particles are preferably used since resin particles have a high affinity for the binder material and a small specific gravity.

As for the shape of the particulate matting agent, spherical and amorphous particles can be used. However, to obtain a consistent anti-glare property, spherical particles are desirable. Two or more kinds of particulate materials may also be used in combination.

The hydrocarbon-based hard coat composition of layer 18 preferably includes surface modified inorganic particles that add mechanical strength to the resultant coating, and thus the hard coat composition is more properly described as a ceramer composition. One example of such particles is colloidal silica reacted with a methacryl-substituted silane coupling agent such as A-174 (available from Natrochem, Inc.), other dispersant aids such as N,N dimethylacrylamide and various other additives (stabilizers, initiators, etc.).

Specific examples of ceramer compositions that may be used in this preferred embodiment are also described in U.S. Pat. No. 6,238,798 to Kang et al. One such ceramer hardcoat is made as described in column 10, lines 25–39 and Example 1 of U.S. Pat. No. 5,677,050, which is incorporated herein by reference.

The resultant coating layer 18 of any of the preferred embodiments provides improved properties to the article 10. These properties include improved optical properties (including decreased glare and improved optical transmission), improved soil resistance, and improved ink and stain repellency as compared with uncoated optical devices or as compared with optical devices coated with conventional hard coat materials.

To facilitate curing, polymerizable compositions according to the present invention may further comprise at least one free-radical thermal initiator and/or photoinitiator. Typically, if such an initiator and/or photoinitiator are present, it comprises less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. No. 4,654,233 (Grant et al.); U.S. Pat. No. 4,855,184 (Klun et al.); and U.S. Pat. No. 6,224,949 (Wright et al.).

Useful free-radical thermal initiators include, for example, azo, peroxide, persulfate, and redox initiators, and combinations thereof.

Useful free-radical photoinitiators include, for example, those known as useful in the UV cure of acrylate polymers. Such initiators include benzophenone and its derivatives; benzoin, alpha-methylbenzoin, alpha-phenylbenzoin, alpha-allylbenzoin, alpha-benzylbenzoin; benzoin ethers such as benzil dimethyl ketal (commercially available under the trade designation "IRGACURE 651" from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba Specialty Chemicals Corporation) and 1-hydroxycyclohexyl phenyl ketone (commercially available under the trade designation "IRGACURE 184", also from Ciba Specialty Chemicals Corporation); 2-methyl-1-[4-(methylthio)phenyl]-2-(4-morpholinyl)-1-propanone commercially available under the trade designation "IRGACURE 907", also from Ciba Specialty Chemicals Corporation); 2-benzyl-2-(dimethylamino)-1-[4-(4-morpholinyl)phenyl]-1-butanone commercially available under the trade designation "IRGACURE 369" from Ciba Specialty Chemicals Corporation); aromatic ketones such as benzophenone and its derivatives and anthraquinone and its derivatives; onium salts such as diazonium salts, iodonium salts, sulfonium salts; titanium complexes such as, for example, that which is commercially available under the trade designation "CGI 784 DC", also from Ciba Specialty Chemicals Corporation); halomethylnitrobenzenes; and mono- and bis-acylphosphines such as those available from Ciba Specialty Chemicals Corporation under the trade designations "IRGACURE 1700", "IRGACURE 1800", "IRGACURE 1850", "IRGACURE 819" "IRGACURE 2005", "IRGACURE 2010", "IRGACURE 2020" and "DAROCUR 4265". Combinations of two or more photoinitiators may be used. Further, sensitizers such as 2-isopropyl thioxanthone, commercially available from First Chemical Corporation, Pascagoula, Miss., may be used in conjunction with photoinitiator(s) such as "IRGACURE 369".

Thin coating layers 18 can be applied to the substrate 16 using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, Modern Coating and Drying Technology, VCH Publishers, NY 1992, ISBN 3-527-28246-7 and Gutoff and Cohen, Coating and Drying Defects: Troubleshooting Operating Problems, Wiley Interscience, NY ISBN 0-471-59810-0.

A die coater generally refers to an apparatus that utilizes a first die block and a second die block to form a manifold cavity and a die slot. The coating fluid, under pressure, flows through the manifold cavity and out the coating slot to form a ribbon of coating material. Coatings can be applied as a single layer or as two or more superimposed layers. Although it is usually convenient for the substrate to be in the form of a continuous web, the substrate may also be a succession of discrete sheets. Alternative means of providing the hardcoat layer on a major surface of a substrate (e.g. optical film) include heat lamination of the coated film and adhesive bonding of the coated films (e.g. pressure sensitive adhesive, radiation curable adhesive). In one embodied method, a film comprising a thermoplastic adhesive layer on the opposing surface is thermally coupled to a substrate (e.g. a lens) by providing the film within an inner cavity of a molding die, closing the die, and injecting molten polymeric material to substantially fill the inner cavity (thereby molding the optical substrate concurrently with attaching the protective film by means of the adhesive), cooling said molten polymeric material, and removing the optical substrate from the molding die.

To prove the effectiveness of the hard coat formulations according to each preferred embodiment of the present invention described above, sample hard coats having the given compositions were formulated and applied to PET substrates and compared to hard coat formulations having less than all the desired components. The coatings were visually inspected and tested for ink repellency, durability and surface roughness. The experimental procedures and tabulated results are described below:

I. Experimental Procedures:

A: Ingredients

Unless otherwise noted, as used in the examples, "HFPO-" refers to the end group $F(CF(CF_3)CF_2O)_aCF(CF_3)$— wherein a averages about 6.8. $F(CF(CF_3)CF_2O)_aCF(CF_3)COOCH_3$ ($HFPO-C(O)OCH_3$), wherein a averages about 6.8, with an average molecular weight of 1,211 g/mol, can be prepared according to the method reported in U.S. Pat. No. 3,250,808 (Moore et al.), the disclosure of which is incorporated herein by reference, with purification by fractional distillation.

Trimethylolpropane triacrylate ("TMPTA") was obtained from Sartomer Company, Exton, PA under the trade designation "SR351" (AC-1).

Pentaerythritol tetracrylate ("PETA") was obtained from Sartomer Company, under the trade designation "SR295".

The amines triethylamine, diisopropylethyl amine, N-methyl-1,3-propanediamine, 2-amino-2-ethyl-1,3-propane diol, 2-amino-2-methyl-1,3-propane diol, and 2-amino-1,3-propane diol, 2-aminoethanol, 2-(2-aminoethylamino)ethanol, and 3-amino-1,2-propanediol were obtained from Sigma-Aldrich of Milwaukee, Wis.

Acryloyl chloride was obtained from Sigma-Aldrich if Milwaukee Wis.

The UV photoinitiator, 1-hydroxycyclohexyl phenyl ketone used was obtained from Ciba Specialty Products, Tarrytown, N.Y. and sold under the trade designation "Irgacure 184."

The photoinitiator 2-methyl-1-[4-(methylthio)phenyl]-2-morpholinopropan-1-one used was obtained from Ciba Specialty Products, Tarrytown, N.Y. and sold under the trade designation "Irgacure 907.".

B. Preparation of Experimental Materials

1. Preparation of Monofunctional Perfluoropolyether Acrylate (MP-1)-HFPO—C(O)N(H)CH$_2$CH$_2$OC(O)CH=CH$_2$ (HFPO-AEA)

a. Preparation of HFPO—C(O)—NH—CH$_2$CH$_2$—OH Starting Material (i.e. HFPO-AE-OH)

50.0 g of the HFPO—C(O)OCH$_3$ (i.e. Mw=1211 g/mole) was placed in a 200 ml round bottom flask. The flask was purged with nitrogen and placed in a water bath to maintain a temperature of 50 degrees Celsius or less. To this flask was added 3.0 g (0.045 mol) of 2-aminoethanol. The reaction mixture was stirred for about 1 hour, after which time an infrared spectrum of the reaction mixture showed complete loss of the methyl ester band at 1790 cm$^{-1}$ and the presence of the strong amide carbonyl stretch at 1710 cm$^{-1}$. 200 ml of methyl t-butyl ether (MTBE) was added to the reaction mixture and the organic phase was extracted twice with water/HCl (about 5%) to remove unreacted amine and methanol. The MTBE layer was dried with MgSO$_4$. The MTBE was removed under reduced pressure to yield a clear, viscous liquid. Proton ($^1$H) Nuclear magnetic resonance spectroscopy (NMR) and infrared spectroscopy (1R) confirmed the formation of the above-identified compound.

b. Preparation of (MP-1) from Starting Material

HFPO-AE-OH (600 g) was combined with ethyl acetate (600 g) and triethylamine (57.9 g) in a 3-neck round bottom flask that was fitted with a mechanical stirrer, a reflux condenser, addition funnel, and a hose adapter that was connected to a source of nitrogen gas. The mixture was stirred under a nitrogen atmosphere and was heated to 40 degrees Celsius. Acryloyl chloride (51.75 g obtained from Aldrich Chemical) was added dropwise to the flask from the addition funnel over about 30 minutes. The mixture was stirred at 40 degrees Celsius overnight. The mixture was then allowed to cool to room temperature, diluted with 300 mL of 2N aqueous HCl and transferred to a separatory funnel. The aqueous layer was removed and the ethyl acetate layer was extracted with another 300 ml portion of 2N HCl. The organic phase was then extracted once with 5-weight percent aqueous NaHCO$_3$ separated, dried over MgSO$_4$ and filtered. Removal of the volatile components using a rotary evaporator resulted in 596 g of product (93% yield). Proton ($^1$H) NMR and IR spectroscopy confirmed the formation of the above-identified compound.

2. Preparation of Monofunctional Perfluoropolyether Methacrylate (MP-2)

HFPO—C(O)N(H)CH$_2$CH$_2$OC(O)C(CH$_3$)=CH$_2$ (HFPO-AEMA) (MP-2) is made by a procedure similar to that described in U.S. Publication No. 2004-0077775 entitled "Fluorochemical Composition Comprising a Fluorinated Polymer and Treatment of a Fibrous Substrate Therewith," filed on May 24, 2002, for Synthesis of (HFPO)$_k$-methacrylate, substituting F(CF(CF$_3$)CF$_2$O)$_a$CF(CF$_3$)C(O)NHCH$_2$CH$_2$OH with a=6.8, molecular weight 1344, for the F(CF(CF$_3$)CF$_2$O)$_a$CF(CF$_3$)C(O)NHCH$_2$CH$_2$OH with a=10.5.

3. Preparation of Monofunctional Perfluoropolyether Acrylate (MP-3)-HFPO—C(O)N(H)(CH$_2$CH$_2$O)$_3$C(O)CH=CH$_2$ a. Preparation of HFPO—C(O)N(H)C(CH$_2$OH)$_2$CH$_2$CH$_3$ Starting Material By a method similar to the preparation of HFPO—C(O)N(H)C(CH$_2$OH)$_2$CH$_2$CH$_3$ described below in the preparation of FC-1, 100 g (0.0826 mol) HFPO—C(O)CH$_3$ was reacted with 12.30 g (0.0825 mol) H$_2$N(CH$_2$CH$_2$O)$_3$H neat to provide the desired product.

b. Preparation of (MP-3) from Starting Material

In a method similar to the preparation of HFPO—C(O)N(H)C(CH$_2$OC(O)CH=CH$_2$)$_2$CH$_2$CH$_3$, 25 g (0.01822 mol) HFPO—C(O)N(H)(CH$_2$CH$_2$O)$_3$H starting material was reacted with 1.98 g (0.02187 mol) acryloyl chloride and 2.83 g (0.02187) diisopropylethylamine in 50 g of methyl-t-butyl ether, to provide after workup and chromatography, the desired product as a clear liquid.

4. Preparation of Polyfunctional Perfluoropolyether Acrylate HFPO—C(O)N(H)C(CH$_2$OC(O)CH=CH$_2$)$_2$CH$_2$CH$_3$ (FC-1)

a. Preparation of HFPO—C(O)N(H)C(CH$_2$OH)$_2$CH$_2$CH$_3$ Starting Material

To a 500 ml 3 necked flask equipped with a stir bar and reflux condenser was charged 11.91 g (0.1 mol) H$_2$NC(CH$_2$OH)$_2$CH$_2$CH$_3$ and 60 g THF. Next via dropping funnel was added 121.1 g (0.1 mol) HFPO—C(O)OCH$_3$ over about 80 min at a bath temperature of about 85 degrees Celsius. The reaction was cloudy at first, but became clear about 1 h into the reaction. After addition was complete, the heating bath was shut off and the reaction was allowed to cool for 3 days. The material was concentrated at 55 degrees Celsius under aspirator vacuum to yield 130.03 g of a light colored syrup. NMR analysis showed the product to be an 87:13 mixture of the structures I to II as follows:

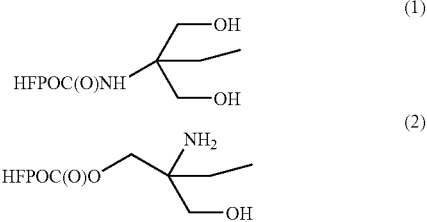

b. Preparation of (FC-1) from Starting Material

To a 250 ml 3 necked round bottom flask equipped with overhead stirrer was charged 65 g (0.05 mol) of HFPO—C(O)N(H)C(CH$_2$OH)$_2$CH$_2$CH$_3$, the product mixture generated above, 12.65 g (0.125 mol) triethylamine and 65 g ethyl acetate. To the flask at room temperature was added 11.31 g(0.125 mol) acryloyl chloride using a pressure-equalizing dropping funnel over 12 min, with the reaction temperature rising from 25 to a maximum of 40° C. The dropping funnel was rinsed with 5 g additional ethyl acetate that was added to the reaction flask, that was then placed in a 40° C. bath and allowed to react for 2 hours and 10 min additional time. The organic layer was then successively washed with 65 g 2% aqueous sulfuric acid, 65 g 2% aqueous sodium bicarbonate, and 65 g water, dried over anhydrous magnesium sulfate, filtered, treated with 16 mg methoxyhydroquinone (MEHQ), and concentrated on a rotary evaporator at 45° C. to yield 62.8 g of crude product. Next 35 g of this material was chromatographed on 600 ml of silica gel (SX0143U-3, Grade 62, 60–200 mesh, EM Science) using 25:75 ethyl acetate: heptane as an eluent. The first two fractions were 250 ml in volume, the remaining fractions were 125 ml in volume. Fractions 4–10 were combined, 8 mg MEHQ was added to the fractions, and solvent was removed on a rotary evaporator at 55C to provide 25.36 g of product that was analyzed by NMR, and found to be an 88:12 mixture of the structures III to IV.

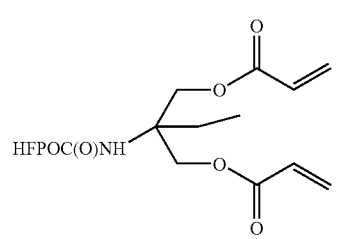

(3)

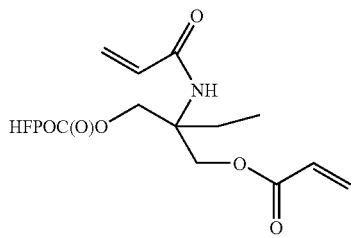

(4)

5. Preparation of Polyfunctional Perfluoropolyether Acrylate-HFPO—C(O)N(H)C(CH$_2$OC(O)CH=CH$_2$)$_2$H (FC-2)

a. Preparation of HFPO—C(O)N(H)C(CH$_2$OH)$_2$H Starting Material

By a method similar to the preparation of HFPO—C(O)N(H)C(CH$_2$OH)$_2$CH$_2$CH$_3$, 106.74 g (0.088 mol) HFPO—C(O)CH$_3$ was reacted with 8.03 g (0.088 mol) 2-amino-1,3-propanediol in 51 g THF to provide a product that was 93:7 amide diol: ester amino-alcohol.

b. Preparation of (FC-2) from Starting Material

In a method similar to the preparation of HFPO—C(O)N(H)C(CH$_2$OC(O)CH=CH$_2$)$_2$CH$_2$CH$_3$, 50 g (0.3936 mol) HFPO—C(O)N(H)C(CH$_2$OH)$_2$H Starting Material was reacted with 8.55 g (0.0945 mol) acryloyl chloride and 9.56 g (0.946 mol) triethylamine in 100 g of ethyl acetate, to provide after workup and chromatography, the 93:7 mixture of diacrylate and acrylamide-acrylate.

6. Preparation of Polyfunctional Perfluoropolyether Acrylate (FC-3) HFPO—C(O)N(H)CH$_2$CH(OC(O)CH=CH$_2$)CH$_2$OC(O)CH=CH$_2$ a. Preparation of HFPO—C(O)N(H)CH$_2$CH(OH)CH$_2$OH Starting Material By a method similar to the preparation of HFPO—C(O)N(H)C(CH$_2$OH)$_2$CH$_2$CH$_3$, 121.1 g (0.100 mol) HFPO—C(O)CH$_3$ was reacted with 9.11 g (0.100 mol) 1-amino-2,3-propanediol in 55.7 g THF to provide a product that was 86:14 amide diol: ester amino-alcohol.

b. Preparation of (FC-3) from Starting Material

In a method similar to the preparation of HFPO—C(O)N(H)C(CH$_2$OC(O)CH=CH$_2$)$_2$CH$_2$CH$_3$, 63.5 g (0.050 mol) HFPO—C(O)N(H)CH$_2$CH(OH)CH$_2$OH was reacted with 11.26 g (0.0945 mol) acryloyl chloride and 9.56 g (0.946 mol) triethylamine in 100 g of ethyl acetate, to provide after workup and chromatography, the 86:14 mixture of diacrylate and acrylamide-acrylate.

7. Preparation of Perfluoropolyether Acrylate HFPO—C(O)N(H)CH$_2$CH$_2$CH$_2$N(CH$_2$CH$_2$OC(O)CH=CH$_2$)$_2$ (FC4)

a. Preparation of Polyfunctional HFPO—C(O)N(H)CH$_2$CH$_2$CH$_2$N(CH$_2$CH$_2$OH)$_2$ Starting Material By a method similar to the preparation of HFPO—C(O)N(H)C(CH$_2$OH)$_2$CH$_2$CH$_3$, 100 g (0.0826 mol) HFPO—C(O)CH$_3$ was reacted with 13.40 g (0.0826 mol) H$_2$NCH2CH2CH$_2$N(CH$_2$CH$_2$OH)$_2$ neat at 130C to provide the desired product as a thick yellow liquid.

b. Preparation of (FC-4) from Starting Material

In a method similar to the preparation of HFPO—C(O)N(H)C(CH$_2$OC(O)CH=CH$_2$)$_2$CH$_2$CH$_3$, 50 g (0.03728 mol) HFPO—C(O)N(H)CH2CH2CH$_2$N(CH$_2$CH$_2$OH)$_2$ Starting Material was reacted with 7.42 g (0.08202 mol) acryloyl chloride and 10.60 (0.08202) diisopropylethylamine in 68 g of methyl-t-butyl ether, to provide after workup and chromatography, the desired product as a clear liquid.

8. Preparation of Polyfunctional Perfluoropolyether Acrylate (FC-5)—HFPO—C(O)N(H)CH$_2$CHN(C(O)CH=CH$_2$)CH$_2$CH$_2$OC(O)CH=CH$_2$ a. Preparation of HFPO—C(O)N(H)CH$_2$CHNHCH$_2$CH$_2$OH Starting Material A 100 ml round bottom flask was charged with 50.0 g (0.413 mol) HFPO—C(O)OCH$_3$ and heated to 40C in an oil bath. The flask was removed from the bath and 4.30 (0.413 mol) 2-(2-aminoethylamino)ethanol was charged to the flask. The contents were swirled together and heated with stirring at 65° C. in an oil bath for 3 h, then concentrated at 65° C. on a rotary evaporator under aspirator pressure to provide the product.

b. Preparation of (FC-5) from Starting Material

In a method similar to the preparation of HFPO—C(O)N(H)C(CH$_2$OC(O)CH=CH$_2$)$_2$CH$_2$CH$_3$, 64.15 g (0.050 mol) HFPO—C(O)N(H)CH2CHNHCH2CH$_2$OH was reacted with 11.26 g (0.125 mol) acryloyl chloride and 12.65 g (0.125 mol) triethylamine in 65 g of ethyl acetate, to provide after workup and chromatography, the desired product.

9. Preparation of an Approximately 1:1 Molar Ratio Adduct of HFPO—C(=O)NHCH$_2$CH$_2$CH$_2$NHCH$_3$ Starting Material with TMPTA.(FC-6)

a. Preparation of HFPO—C(=O)NHCH$_2$CH$_2$CH$_2$NHCH$_3$ Starting Material

A 1-liter round-bottom flask was charged with 291.24 g (0.2405 mol) of HFPOC(O)OCH$_3$ and 21.2 g (0.2405 mol) N-methyl-1,3-propanediamine, both at room temperature, resulting in a cloudy solution. The flask was swirled and the temperature of the mixture rose to 45° C., and to give a water-white liquid, which was heated overnight at 55° C. The product was then placed on a rotary evaporator at 75° C. and 28 inches of Hg vacuum to remove methanol, yielding 301.88 g of a viscous slightly yellow liquid, nominal molecular weight=1267.15 g/mol.

b. Preparation of FC-6 from an Approximately 1:1 Molar Ratio Adduct of HFPO—C(=O)NHCH$_2$CH$_2$CH$_2$NHCH$_3$ with TMPTA.(FC-6)

A 250-mL round-bottom flask was charged with 4.48 g (15.13 mmol) TMPTA, 4.45 g of tetrahydrofuran (THF), and 1.6 mg of phenothiazine, and heated at 55 degrees Celsius in an oil bath. Next, in a 100-mL jar was dissolved 20 g (15.78 mmol) of HFPO—C(=O)NHCH$_2$CH$_2$CH$_2$NHCH$_3$ in 32 g of THF. This solution was placed in a 60-mL dropping funnel with pressure equalizing sidearm. The jar was rinsed with about 3 mL of THF which was also added to the dropping funnel, and the contents of the funnel were added over 38 min, under an air atmosphere to the TMPTA/THF/ phenothiazine mixture. The reaction was cloudy at first, but cleared after about 30 minutes. Twenty minutes after the addition was complete, the reaction flask was placed on a rotary evaporator at 45–55 degrees Celsius an under 28 inches of Hg vacuum to yield 24.38 g of a clear, viscous yellow liquid, that was characterized by $^1$H and $^{13}$C NMR and HPLC/mass spectroscopy. The resulting material) had the following approximate molar product distribution as determined by HPLC/mass spectroscopy to be 20 percent TMPTA, 40 percent of a monoadduct believed to have the formula (5):

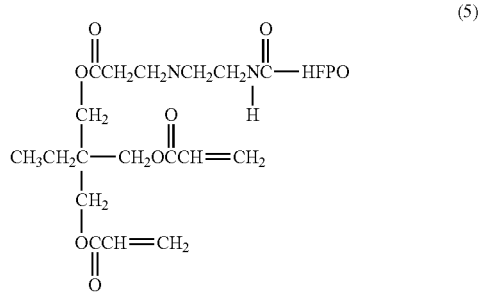

(5)

and 40 percent of diadduct.

10. Fluoroalkyl and Fluoroalkylene Acrylates.

The following materials are available from the vendors indicated: 2,2,2-Trifluoroethyl-methacrylate, 2,2,3,3,4,4,5,5-octafluorohexanediol diacrylate and 1H,1H-2,2,3,3,4,4,4-heptafluorobutyl acrylate (Sigma-Aldrich, Milwaukee, Wis.), ω-hydro 2,2,3,3,4,4,5,5-octafluoropentyl acrylate (Oakwood Products, West Columbia, S.C., and perfluorocyclohexylmethyl methacrylate can be prepared as described in Example 1 of U.S. Pat. No. 5,148,511, to Savu, et al.

FBSEA (C$_4$F$_9$SO$_2$N(CH$_3$)CH$_2$CH$_2$OC(O)CH=CH$_2$) is made by the procedure of Examples 2A and 2B of WO01/30873A.

FBSEMA (C$_4$F$_9$SO$_2$N(CH$_3$)CH$_2$CH$_2$OC(O)C(CH$_3$)=CH$_2$) is made by the procedure of Examples 2A and 2B of WO01/30873A, except that methacrylic acid was used in place of acrylic acid.

FBSEE (C$_4$F$_9$SO$_2$N(C$_2$H$_4$OH)$_2$), a fluorochemical diol, can be prepared as described in column 5, line 31 and in FIG. 9 of U.S. Pat. No. 3,734,962 (1973).

FBSAA (C$_4$F$_9$SO$_2$N(CH$_2$CH$_2$OC(O)CH=CH$_2$)$_2$) is prepared by the procedure in column 25 lines 49–63 of U.S. Pat. No. 6,238,798 to Kang, et al.

11. Preparation of C$_4$F$_9$SO$_2$N(CH$_3$)C$_2$H$_4$OC(O)CH$_2$SH: (FC—SH)

A 500 mL three-necked round bottom flask was charged with 16.86 g of C$_4$F$_9$SO$_2$N(CH$_3$)CH$_2$CH$_2$OH (MW=357; 47.22 mmol; Example 2, A from WO 01/30873), 4.35 g HSCH$_2$CO$_2$H (MW=92.12, 47.22 mmol; available from Sigma-Aldrich), 2 drops of CF$_3$SO$_3$H catalyst, and 120 mL toluene. The mixture was heated to reflux under nitrogen at 115–120° C. with a mechanical stirrer for 8 hours. Water was removed by azeotropic distillation. Fourier Transform Infrared Spectroscopy (FTIR) analysis indicated the formation of ester. Toluene was stripped using a rotary evaporator (21.35 g solid).

C. Experiments

The ceramer hardcoat ("HC-1") used in the examples is made as described in column 10, line 25–39 and Example 1 of U.S. Pat. No. 5,677,050 to Bilkaldi, et al.

Solutions coated for examples in Tables I and II were prepared at about 40% solids in isopropyl alcohol and coated at a dry thickness of about 6 microns using a number 9 wire wound rod onto a 5-mil Melinex 618 polyethylene terephthalate (PET) film (E.I. DuPont de Nemours and Company, Wilmington, Del.). HC-1 was used as the conventional ceramer hard coat resin. The coatings were dried in an 80 degree Celsius oven for about 2 minutes and then subsequently placed on a conveyor belt and subjected to ultraviolet radiation under nitrogen with a Fusion 500 watt H bulb at 35 ft/min to cure the coating to the PET substrate. The values in all Tables and examples refer to the percent solids of each component of the dry coating.

In Tables I and II, these materials were then evaluated for ink repellency using a King™ marker, in which the marker tip was cut with a razor blade at an angle to allow a wide marking width, and the marker was drawn across the top surface of the hard coating at a speed of roughly 6 inches per second. The ink was allowed to dry onto the coating surface, and the level of repellency graded on a scale from 1 (most repellent) to 5 (least repellent). The process was repeated three times and an average score was recorded.

Contact Angle: The coatings were rinsed for 1 minute by hand agitation in IPA before being subjected to measurement of water contact angles. Measurements were made using deionized water filtered through a filtration system obtained from Millipore Corporation (Billerica, Mass.), on a video contact angle analyzer available as product number VCA-2500XE from AST Products (Billerica, Mass.). Reported values are the averages of measurements on at least three drops measured on the right and the left sides of the drops, and are shown in Table 2. Drop volumes were 5 μL for static measurements and 1–3 μL for advancing and receding.

Smoothness: For some of the tables below, a visual inspection was made regarding the smoothness of the applied dry film. While the measurement of smoothness by visual inspection is a subjective determination, a smooth film, for the purposes of the present invention, is deemed to be a surface layer that is substantially continuous and free of visible defects in reflected light as observed by visual observation of the coating surface at a wide variety of possible angles. Typically, visual observation is accomplished by looking at the reflection of a light source from the coating surface at an angle of about 60 degrees from perpendicular. Visual defects that may be observed include but are not limited to pock marks, fish eyes, orange peel, lumps or substantial waviness, or other visual indicators known to one of ordinary skill in the arts in the optics and coating fields. Thus, a "rough" surface as described below has one or more of these characteristics, and may be indicative of a coating material in which one or more components of the composition are incompatible with each other. Conversely, a substantially smooth coating, characterized below as "smooth" for the purpose of the present invention, presumes to have a coating composition in which the various components, in the reacted final state, form a coating in which the components are compatible or have been modified to be compatible with one another and further has little, if any, of the characteristics of a "rough" surface.

In Table I, incremental levels of HFPO-monoacrylates (HFPO-A) and HFPO-multiacrylates (HFPO-MA) were evaluated by visual inspection for surface quality and for ink repellency.

TABLE I

Performance of marker-repellent hard coat affected by HFPO acrylates

| HC-1 % | MP-1 % | FC-2 % | FC-4 % | FC-5 % | Ink repellency |
|---|---|---|---|---|---|
| 99.5 | 0.5 | | | | 1 |
| 99.8 | 0.2 | | | | 2–3 |
| 99.9 | 0.1 | | | | 2–3 |
| 99.0 | | 1.0 | | | 1 |
| 98.0 | | 2.0 | | | 1 |
| 99.0 | | | 1.0 | | 1 |
| 98.0 | | | 2.0 | | 1 |
| 99.0 | | | | 1.0 | 1 |
| 98.0 | | | | 2.0 | 1 |

As Table I indicates, the addition of small amounts of HFPO-multiacrylates (HFPO-MA) showed outstanding performance in ink repellency. Further, it appears that a 0.5 weight percent or higher addition of HFPO-monoacrylate in the HC-1 hard coat achieved a similar optimum ink repellency.

However, a visual inspection of the surface quality of these samples indicated that the surface was not smooth. It is theorized that this surface imperfection is the result of incompatibility issue between the HC-1 hard coat and either the HFPO-monoacrylate or multi-acrylate.

Next, as shown in Table II, various fluoropolymer chemical compatibilizers, added alone or in conjunction with HFPO-monoacrylates and multi-acrylates were evaluated for surface characteristics and ink repellency.

TABLE II

Performance of marker-repellent hard coat affected by FC compatibilizers

| HC-1 % | MP-1 % | FC-2 % | FBSEA % | FC-SH % | Coated Surface | Ink Repellency |
|---|---|---|---|---|---|---|
| 99.8 | 0.2 | | | | Rough | 2–3 |
| 89.9 | 0.1 | | 10 | | smooth | 1–2 |
| 95 | 0.2 | | | 4.8 | Smooth | 1 |
| 90 | | | 10 | | Smooth | 3 |
| 90 | | | | 10 | Smooth | 3 |

The results in Table II indicate that the addition of a perfluorobutyl-substituted acrylate (here FBSEA, added 10% by weight), in conjunction with HFPO-monacrylate MP-1, showed improved surface characteristics as compared with adding HFPO-acrylate to the HC-1 alone ("the standard"). While not wishing to be bound by theory, it is suggested that the perfluorobutyl-substituted acrylate improves the compatibility between the HC-1 hard coat and the HFPO-monoacrylate, and as a result improves surface smoothness.

The results also show that the addition of the perfluorobutyl-substituted acrylate (here FBSEA, added 10% by weight) alone to the HC-1 showed improved surface smoothness as compared with the standard but not the desired ink repellency.

Table II also indicates that the addition of the perfluorobutyl-substituted thiol (here FC—SH added 4.8% by weight) in conjunction with HFPO-monoacrylate or FC-2, showed improved surface characteristics and smoothness as compared with the standard.

However, the addition of the FC—SH (at 10%), without the HFPO-monoacrylate, achieved the desired smoothness but not the desired ink repellency.

Solutions as generally described in Table III below were prepared at 30% solids in a solvent blend of 1:1 isopropanol: ethyl acetate and coated at a dry thickness of about 4 microns using a number 9 wire wound rod onto 5-mil Melinex 618 film. The coatings were dried in an 80 degree Celsius oven for 1 minute and then placed on a conveyer belt coupled to a ultraviolet ("UV") light curing device and UV cured under nitrogen using a Fusion 500 watt H bulb at 20 ft/min.

The coatings were tested for durability using a modified Oscillating Sand Method (ASTM F 735-94). In this method, disks of diameter 85 mm were cut from the coated substrates and placed in 16-ounce jar lids Oars W216922 from Wheaton of Millville, N.J.), then covered with 50 grams of 20–30 mesh Ottawa sand (VWR, Bristol, Conn.). The lid was placed on the jar and the assembly was placed in an orbital shaker (VWR DE-5000E, from VWR in Bristol, Conn.) set at 275 revolutions per minute. After shaking for about 10 minutes, the coated substrate was removed and visually inspected for surface roughness. Further, ink from a "Sanford Sharpie, Fine Point permanent marker, No. 30001" was applied in a line across the diameter of the coated disk surface and observed. The portion of the ink line over which the ink wet the substrate and showed no dewetting or beading was measured, and the length is reported in Table III. A value of 85 mm is considered to be complete loss of ink repellency, while a measure of 0 mm would be considered perfect durability.

TABLE III

| HC-1 % | MP-2 % | Fluorochemical acrylate % | Carbon chain length, % fluori-nation | Surface Rough? | Ink Repel. (mm) |
|---|---|---|---|---|---|
| 90.9 | 0.10 | 9.0 2,2,2-Trifluoroethyl-methacrylate | 2, 34% | Yes | 69 |
| 90.9 | 0.10 | 9.0 ω-hydro 2,2,3,3,4,4,5,5-octafluoropentyl acrylate | 5, 50% | No | 66 |

TABLE III-continued

| HC-1 % | MP-2 % | Fluorochemical acrylate % | Carbon chain length, % fluori-nation | Surface Rough? | Ink Repel. (mm) |
|---|---|---|---|---|---|
| 90.9 | 0.10 | 9.0 perfluorocyclo-hexylmethyl methacrylate | 7, 51% | No | 59 |
| 90.9 | 0.10 | 9.0 1H,1H-2,2,3,3,4,4,4-heptafluorobutyl acrylate | 4, 51% | Yes | 62 |
| 90.9 | 0.10 | 9.0 2,2,3,3,4,4,5,5-octafluorohexanediol diacrylates | 6, 36% | No | 50 |
| 90.9 | 0.10 | 9.0 FBSAA | 8, 34% | No | 52 |
| 90.9 | 0.10 | 9.0 FBSEMA | 7, 40% | No | 52 |
| 90.9 | 0.10 | 9.0 FBSEA | 7, 41.5% | No | 54 |
| 99.9 | 0.10 | None | N/A | Yes | 59 |

As Table III shows, the addition of fluorochemical acrylates having carbon chain lengths of at least 5 carbon atoms, and fluorine contents above 30% showed improved surface roughness characteristics versus the control sample (containing only the HC-1 hard coat and 0.1 weight percent HFPO derivative) and showed similar ink repellency characteristics.

Further, the addition of fluorochemical acrylate having carbon chain lengths of at least 5 carbon atoms showed improved surface roughness characteristics versus the samples having shorter carbon chain lengths.

A 30% solids (in a solvent blend of 1:1 isopropanol:ethyl acetate) sample of 93.62% HC-1/6.3% FBSEA/0.08% FC-6 was prepared. The solution was coated and cured by the same procedure as the Table III examples. The smooth coating gave an ink repellency of 57 after a 10 minute sand test at 270 rpm.

A 30% solids (in a solvent blend of 1:1 isopropanol:ethyl acetate) sample of 94.82% HC-1/5% FBSEA/0.18% FC-1 was prepared. The solution was coated and cured by the same procedure as the Table III examples. The coating had an ink repellency of 40 after a 10 minute sand test at 270 rpm.

Next, in Table IV, an experiment was performed in which varying amounts of a perfluorobutyl-substituted acrylate (here FBSEA) and a HFPO-monoacrylate were added to the HC-1 resin. The resultant coatings were evaluated for ink repellency and receding contact angle (using water as the test liquid). For these experiments, the sand test was run at 300 rpm for 15 min.

TABLE IV

| HC-1 % | FBSEA % | MP-2 % | Pen Repel. | Receding Contact angle (deg) |
|---|---|---|---|---|
| 85.26 | 14.5 | 0.24 | 15 | 103.6 |
| 88.76 | 11 | 0.24 | 30 | 103.9 |
| 92.26 | 7.5 | 0.24 | 26 | 99.7 |
| 95.76 | 4 | 0.24 | 42 | 100.6 |
| 85.32 | 14.5 | 0.18 | 25 | 103.1 |
| 88.82 | 11 | 0.18 | 15 | 103.9 |
| 92.32 | 7.5 | 0.18 | 35 | 97.4 |
| 95.82 | 4 | 0.18 | 38 | 101.1 |
| 85.38 | 14.5 | 0.12 | 40 | 98.4 |
| 88.88 | 11 | 0.12 | 32 | 100 |
| 92.38 | 7.5 | 0.12 | 30 | 99 |
| 95.88 | 4 | 0.12 | 65 | 84.2 |
| 85.44 | 14.5 | 0.06 | 76 | 67.8 |
| 88.94 | 11 | 0.06 | 75 | 69.7 |
| 92.44 | 7.5 | 0.06 | 62 | 93.5 |
| 95.94 | 4 | 0.06 | 62 | 98.4 |

It can be seen that for every level of HFPO monoacrylate derivative, there is an optimum level of FBSEA. At higher levels of the HFPO monoacrylate derivative, higher levels of FBSEA are required to obtain the optimum contact angles. Low levels of HFPO monoacrylate combined with too high a level of FBSEA cause reduced ink repellency and lowered contact angles.

In Table V, an experiment was performed in which varying amounts of a perfluorobutyl-substituted acrylate (here FBSEA) and HFPO-multiacrylate were added to HC-1. The resultant coatings were evaluated for ink repellency and contact angle (using water as the test liquid) after a 15 minute sand test at 300 rpm.

TABLE V

| HC-1 % | FBSAA % | HEPO derivative, % | Ink repellency (mm) | Receding Water Contact Angle (deg) |
|---|---|---|---|---|
| 91.67 | 8.25 | FC-3, 0.08 | 30 | 93.2 |
| 93.92 | 6.00 | FC-3, 0.08 | 0 | 92.3 |
| 95.82 | 4.10 | FC-3, 0.08 | 0 | 99.4 |
| 91.67 | 8.25 | MIP-3, 0.08 | 85 | 48.9 |
| 93.92 | 6.00 | MIP-3, 0.08 | 0 | 88.2 |
| 95.82 | 4.10 | MIP-3, 0.08 | 0 | 95.6 |
| 91.67 | 8.25 | FC-2, 0.08 | 45 | 86.1 |
| 93.92 | 6.00 | FC-2, 0.08 | 25 | 93.3 |
| 95.82 | 4.10 | FC-2, 0.08 | 12 | 93.1 |

As Table V indicates, samples utilizing less FBSEA in conjunction with HFPO multiacrylates produced better ink repellency that samples utilizing higher FBSEA levels, thus confirming that there is an optimum maximum level of FBSEA that can be added to HC-1 hard coat utilizing an HFPO multi-acrylate derivative before ink repellency is compromised.

Another experiment was run in which HC-1 was applied to the 5-mil Melinex 618 film with a metered, precision die coating process. The hardcoat was diluted in to 30 wt-% solids in isopropanol and coated onto the 5-mil PET backing to achieve a dry thickness of 5 microns. A flow meter was used to monitor and set the flow rate of the material from a pressurized container. The flow rate was adjusted by changing the air pressure inside the sealed container which forces liquid out through a tube, through a filter, the flow meter and then through the die. The dried and cured film was wound on a take up roll.

The coatings were dried in a 10-foot oven at 100 degrees Celsius, and cured with a 300-watt Fusion Systems H bulb at 100, 75, 50, and 25% power. In Formulation 1, the ceramer was formed using FBSEA as the perfluorobutyl-substituted acrylate as the compatibilizer, MP-2 as the HFPO derivative, and HC-1 as the ceramer hardcoat. In Formulation 2, the ceramer was formed using FBSEA as the perfluorobutyl-substituted acrylate as the compatibilizer, FC-3 as the HFPO derivative, and HC-1 as the ceramer hardcoat. The sand test was run for 15 min at 300 rpm. The results are summarized in Table VI:

TABLE VI

|  | Wt. % HC-1 | Weight % FBSEA | Weight % HPFO compound | UV dose % power | Ink repellency |
|---|---|---|---|---|---|
| MP-2 | | | | | |
| Formulation 1 | 89.83 | 10.00 | 0.17 | 100 | 0 |
| Formulation 1 | 89.83 | 10.00 | 0.17 | 75 | 38.5 |
| Formulation 1 | 89.83 | 10.00 | 0.17 | 50 | 38.5 |
| Formulation 1 | 89.83 | 10.00 | 0.17 | 25 | 64.1 |
| FC-3 | | | | | |
| Formulation 2 | 97.87 | 2.00 | 0.13 | 100 | 0 |
| Formulation 2 | 97.87 | 2.00 | 0.13 | 75 | 0 |
| Formulation 2 | 97.87 | 2.00 | 0.13 | 50 | 0 |
| Formulation 2 | 97.87 | 2.00 | 0.13 | 25 | 51.3 |

As the results of Table VI confirms, the resultant ceramer coating of both Formulation 1 and 2 did undergo a crosslinking reaction during ultraviolet light exposure, as witnessed by the increased ink repellency at higher UV irradiation levels. Further, the additional acrylate functionality in the HFPO-multiacrylate FC-3 provided more complete curing that the HFPO-monofunctional acrylate MP-2, especially at lower irradiation levels.

A sample of 93.62% HC-1/6.3% FBSEA/0.08% of FC-6 was made. It was coated by the same procedure as the other examples. It gave a smooth coating with a ink repellency of 57 after 10 minutes of sand test at 270 rpm.

The examples in Table VII were prepared, coated and cured in the same way as the Table III examples, except that the samples containing PETA were coated at 30% solids out of ethyl acetate. All resultant coatings were smooth. The sand test was done for 20 min at 300 rpm.

The data in

TABLE VII

| HC-1 % | PETA % | MP-2 % | FC-3 % | FBSEA % | Irgacure 907 % | Ink Repellency |
|---|---|---|---|---|---|---|
| 89.8 | | 0.2 | | 10 | | 52 |
| | 89.8 | 0.2 | | 10 | 2 | 46 |
| | 97.85 | | 0.15 | 2 | 2 | 0 |

Table VII shows that hardcoats without nanoparticles, but containing HFPO acrylates and multiacrylates plus compatibilizers can perform well as hardcoats.

Thus, the present invention provides numerous new methods for achieving smooth, marker and stain resistant, low surface energy hard coatings for use as a single layer on optical devices. The coatings are easy to manufacture and apply.

While the invention has been described in terms of preferred embodiments, it will be understood, of course, that the invention is not limited thereto since modifications may be made by those skilled in the art, particularly in light of the foregoing teachings.

What is claimed is:

1. A composition for use as a substantially smooth hard coat layer in optical displays, the composition comprising:
    a hydrocarbon-based hard coat composition;
    a mono- or multi-(meth)acryl compound bearing at least one monovalent hexafluoropolypropylene oxide moiety; and
    a free radically reactive compatibilizer selected from the group consisting of a fluoroalkyl-group containing compatibilizer and a fluoroalkylene-group containing compatibilizer.

2. The composition of claim 1, wherein said hydrocarbon-based hard coat composition comprises a ceramer hard coat.

3. The composition of claim 2, wherein said ceramer hard coat formulation comprises a multifunctional acrylic-based ceramer hard coat formulation.

4. The composition of claim 1 wherein said mono- or multi-(meth)acryl compound bearing at least one monovalent hexafluoropolypropylene oxide moiety is selected from the group consisting of polyhexafluoropropylene oxide amide methacrylate, hexafluoropropylene oxide mono-acrylate, and hexafluoropropylene oxide multi-acrylate.

5. The composition of claim 1, wherein said mono- or multi-(meth)acryl compound bearing at least one monovalent hexafluoropolypropylene oxide moiety has the chemical formula: $R_{fpe}Q(X)_n$,
    wherein $R_{fpe}$ is a residue of a monovalent HFPO moiety;
    wherein Q is a connecting group selected from the group consisting of an alkylene group, an arylene group, an arylene-alkylene group, and an alkylene-arylene group;
    wherein X is a free-radically reactive group selected from the group consisting of a meth(acryl) reactive group, an SH-reactive group, an allyl reactive group, and a vinyl reactive group; and
    wherein n is 1 to 3.

6. The composition of claim 5, wherein Q is selected from the group consisting of —$SO_2N(R)CH_2CH_2$—; —$SO_2N(CH_2CH_2)_2$—; —$(CH_2)_m$—; —$CH_2O(CH_2)_3$—; and —$C(O)NRCH_2CH_2$—, where R is an H or lower alkyl of 1 to 4 carbon atoms and m is 1 to 6.

7. The composition of claim 5, wherein Q comprises a straight or branched chain connecting group containing heteroatoms selected from the group consisting of O, N, and S.

8. The composition of claim 1, wherein said mono- or multi-(meth)acryl compound bearing at least one monovalent hexafluoropolypropylene oxide moiety has a chemical formula selected from the group consisting of: HFPO—C(O)N(H)C($CH_2OC(O)CH$=$CH_2$)$_2CH_2CH_3$, HFPO—CO—NHCH($CH_2OCO$—CH=$CH_2$)$_2$, HFPO—C(O)N(H)CH$_2$CH(OC(O)CH=$CH_2$)CH$_2$OC(O)CH=$CH_2$, HFPO—CO—NH(CH$_2$)$_3$N(CH$_2$CH$_2$OCOCH=$CH_2$)$_2$, HFPO—CO—NHCH$_2$CH$_2$N(—CO—CH=$CH_2$)(—CH$_2$CH$_2$OCOCH=$CH_2$), and a 1:1 molar ratio adduct of HFPO—C(=O)NHCH$_2$CH$_2$CH$_2$NHCH$_3$ with TMPTA.

9. The composition of claim 1, wherein said free radically reactive compatibilizer comprises a perfluorobutyl substituted acrylate compatibilizer.

10. The composition of claim 9, wherein said perfluorobutyl substituted acrylate compatibilizer is selected from the group consisting of $C_4F_9SO_2N(CH_3)CH_2CH_2OC(O)CH$=$CH_2$, $C_4F_9SO_2N(CH_2CH_2OC(O)CH$=$CH_2)_2$, and $C_4F_9SO_2N(CH_3)CH_2CH_2OC(O)C(CH_3)$=$CH_2$, and mixtures thereof.

11. The composition of claim 1, wherein said fluoroalkyl-group containing compatibilizer has the chemical formula $R_fQ(X)_n$;
    wherein $R_f$ is a fluoroalkyl;
    wherein Q is a connecting group selected from the group consisting of an alkylene, an arylene, an arylene-alkylene, and an alkylene-arylene group;

wherein X is a free-radically reactive group selected from the group consisting of a meth(acryl) reactive group, an SH-reactive group, an allyl reactive group, and a vinyl reactive group; and wherein n is 1 to 3.

12. The composition of claim 11, wherein Q further comprises a straight or branched chain connecting group containing heteroatoms selected from the group consisting of O, N, and S.

13. The composition of claim 11, wherein Q is selected from the group consisting of a —SO$_2$N(R)CH$_2$CH$_2$— group, a —SO$_2$N(CH$_2$CH$_2$)$_2$— group, a —(CH$_2$)$_m$— group, a —CH$_2$O(CH$_2$)$_3$-group, and a —C(O)NRCH$_2$CH$_2$— group, wherein m is 1 to 6 and wherein R is an H or lower alkyl of 1 to 4 carbon atoms.

14. The composition of claim 11, wherein R is lower alkyl of 1 to 4 carbon atoms.

15. The composition of claim 11, wherein m is 1 to 6.

16. The composition of claim 1, wherein said fluoroalkylene-group containing compatibilizer has the chemical formula: ((X)$_n$QR$_{f2}$Q(X)$_n$), wherein R$_f$ is a fluoroalkylene;

wherein Q is a connecting group selected from the group consisting of an alkylene group, an arylene group, an arylene-alkylene group, and an alkylene-arylene group;

wherein X is a free-radically reactive group selected from the group consisting of a meth(acryl) group, a SH group, an allyl group, and a vinyl group; and wherein n is 1 to 3.

17. The composition of claim 16, wherein Q further comprises a straight or branched chain connecting group containing heteroatoms selected from the group consisting of O, N, and S.

18. The composition of claim 16, wherein Q is selected from the group consisting of a —SO$_2$N(R)CH$_2$CH$_2$— group, a —SO$_2$N(CH$_2$CH$_2$)$_2$— group, a —(CH$_2$)$_m$— group, a —CH$_2$O(CH$_2$)$_3$— group, and a —C(O)NRCH$_2$CH$_2$— group, wherein m is 1 to 6 and wherein R is lower alkyl of 1 to 4 carbon atoms.

19. The composition of claim 16, wherein R is an H or lower alkyl of 1 to 4 carbon atoms.

20. The composition of claim 16, wherein m is 1 to 6.

21. The composition of claim 16, wherein X is selected from the group consisting of a thiol group and a polythiol group.

22. The composition of claim 1, wherein said perfluoroalkyl containing substituted compatibilizer comprises a perfluoroalkyl containing substituted acrylate compatibilizer having a carbon chain of at least 5 carbon atoms attached to a (meth)acryl end group and further having a fluorine content that exceeds thirty weight percent of the total weight of said perfluoroalkyl containing substituted acrylate compatibilizer.

23. The composition of claim 22, wherein said perfluoroalkyl containing substituted acrylate compatibilizer is selected from the group consisting of (perfluorocyclohexyl) methyl acrylate, 2,2,3,3,4,4,5,5-octafluorohexanediol diacrylate, perfluorocyclohexylmethyl methacrylate o)-hydro 2,2,3,3,4,4,5,5-octafluoropentyl acrylate, C$_4$F$_9$SO$_2$N(CH$_3$) CH$_2$CH$_2$OC(O)CH═CH$_2$, C$_4$F$_9$SO$_2$N(CH$_2$CH$_2$OC(O) CH═CH$_2$)$_2$, and C$_4$F$_9$SO$_2$N(CH$_3$)CH$_2$CH$_2$OC(O) C(CH$_3$)═CH$_2$, and mixtures thereof.

24. The composition of claim 1, wherein said free radically reactive compatibilizer comprises between about 2% and about 15% of the total weight of the hard coating composition.

25. The composition of claim 1, wherein the amount of said free radically reactive compatibilizer comprises at least 3 times the amount of said monomer in said hard coat composition.

26. An optical display comprising a substantially smooth layer of said composition formed according to claim 1 applied and cured to an optical substrate.

27. The optical display of claim 26 further comprising an adhesive coated to said substrate such that said optical substrate is located between said layer of said composition and said adhesive.

* * * * *

UNITED STATES PATENT AND TRADEMARK OFFICE
CERTIFICATE OF CORRECTION

PATENT NO.          : 7,173,778 B2                                      Page 1 of 3
APPLICATION NO.     : 11/121456
DATED               : February 6, 2007
INVENTOR(S)         : Naiyong Jing et al.

It is certified that error appears in the above-identified patent and that said Letters Patent is hereby corrected as shown below:

Column 8
Line 55, Delete "Rfpe" and insert -- $R_{fpe}$ --, therefor.

Column 12
Line 9, After ""IRGACURE 819"" insert -- , --.

Line 64-65, Delete "F(CF(CF$_3$)CF$_2$O)aCF(CF$_3$)–" and insert
-- F(CF(CF$_3$)CF$_2$O)$_a$CF(CF$_3$) --, therefor.

Column 13
Line 48, Delete "(1R)" and insert -- (IR) --, therefor.

Column 16
Line 21, Delete "(FC4)" and insert -- (FC-4) --, therefor.

Line 28, Delete "H$_2$NCH2CH2CH$_2$N(CH$_2$CH$_2$OH)$_2$" and insert
-- H$_2$NCH$_2$CH$_2$CH$_2$N(CH$_2$CH$_2$OH)$_2$ --, therefor.

Line 28, Delete "130C" and insert -- 130°C --, therefor.

Line 33, Delete "HFPO–C(O)N(H)CH2CH2CH$_2$N(CH$_2$CH$_2$OH)$_2$" and insert
-- HFPO–C(O)N(H)CH$_2$CH$_2$CH$_2$N(CH$_2$CH$_2$OH)$_2$ --, therefor.

Line 57, Delete "HFPO–C(O)N(H)CH2CHNHCH2CH$_2$OH" and insert
-- HFPO–C(O)N(H)CH$_2$CHNHCH$_2$CH$_2$OH --, therefor.

UNITED STATES PATENT AND TRADEMARK OFFICE
CERTIFICATE OF CORRECTION

PATENT NO. : 7,173,778 B2  
APPLICATION NO. : 11/121456  
DATED : February 6, 2007  
INVENTOR(S) : Naiyong Jing et al.

Page 2 of 3

It is certified that error appears in the above-identified patent and that said Letters Patent is hereby corrected as shown below:

Column 17
Line 40-50,

Delete " 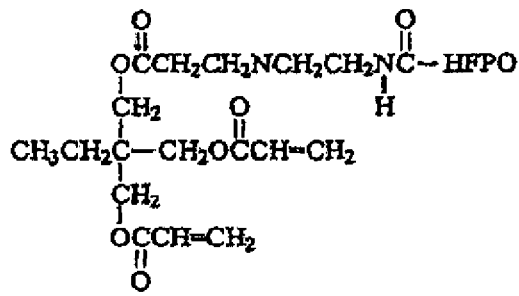 " and insert -- 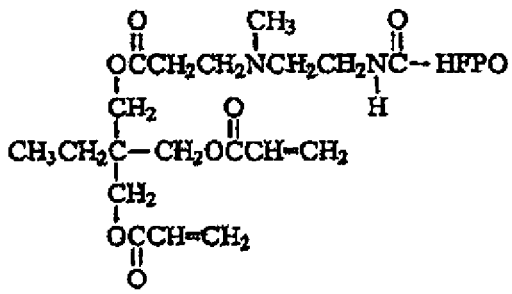 --, therefor.

Column 20
Line 3, Delete "HFPO-monacrylate" and insert -- HFPO-monoacrylate --, therefor.

Line 22-24, Delete "However, the addition......ink repellency." and insert the same on line 21 (approx.) after "standard." as a continuation of Paragraph.

Line 29, Delete "fihn." and insert -- film. --, therefor.

Line 38, Delete "Oars" and insert -- (jars --, therefor.

Line 45, Delete "rouglmess." and insert -- roughness. --, therefor.

UNITED STATES PATENT AND TRADEMARK OFFICE
CERTIFICATE OF CORRECTION

PATENT NO. : 7,173,778 B2
APPLICATION NO. : 11/121456
DATED : February 6, 2007
INVENTOR(S) : Naiyong Jing et al.

It is certified that error appears in the above-identified patent and that said Letters Patent is hereby corrected as shown below:

Column 22
Line 30, Delete "HEPO" and insert -- HFPO --, therefor.

Line 34, Delete "MIP-3," and insert -- MP-3, --, therefor.

Line 35, Delete "MIP-3," and insert -- MP-3, --, therefor.

Line 36, Delete "MIP-3," and insert -- MP-3, --  therefor.

Column 23
Line 7, Delete "HPFO" and insert -- HFPO --, therefor.

Column 26
Line 18, In Claim 23, delete "o)-hydro" and insert -- ω-hydro --, therefor.

Signed and Sealed this

Twenty-third Day of June, 2009

JOHN DOLL
*Acting Director of the United States Patent and Trademark Office*